(12) United States Patent
Ambrose et al.

(10) Patent No.: US 6,189,833 B1
(45) Date of Patent: Feb. 20, 2001

(54) AIRCRAFT SLIDING DOOR SYSTEM

(75) Inventors: Michael H. Ambrose, Trumbull; Kenneth J. Russo, Hamden, both of CT (US)

(73) Assignee: Sikorsky Aircraft Corporation, Stratford, CT (US)

( * ) Notice: Under 35 U.S.C. 154(b), the term of this patent shall be extended for 0 days.

(21) Appl. No.: 09/162,818

(22) Filed: Sep. 29, 1998

(51) Int. Cl.[7] .................................................... B64C 1/14
(52) U.S. Cl. ............................ 244/129.5; 244/118.3; 49/426
(58) Field of Search ........................... 244/129.5, 129.4, 244/118.3, 129.6; 49/413–440, 404

(56) References Cited

U.S. PATENT DOCUMENTS

| | | | |
|---|---|---|---|
| 3,745,707 | * | 7/1973 | Herr ........................................ 49/449 |
| 3,802,125 | * | 4/1974 | Baker ...................................... 49/360 |
| 5,181,677 | * | 1/1993 | Kaplan et al. ....................... 244/129.5 |
| 5,259,576 | * | 11/1993 | Howard ............................... 244/129.5 |
| 5,921,613 | * | 7/1999 | Breuning ................................ 49/212 |

OTHER PUBLICATIONS

Brochure, *Eurocopter EC135*, Eurocopter, 1997.
Photographs Boeing CH–47, Date Unknown.
Photograph Sikorsky S76.
Photograph Westland EH101.

\* cited by examiner

*Primary Examiner*—J. Woodrow Eldred
(74) *Attorney, Agent, or Firm*—Wiggin & Dana; William B. Slate (57) ABSTRACT

An aircraft door is slidable along a door path between open and closed positions. The door is guided by one or more tracks. Riders carried by the door are engaged to the tracks. Each rider includes a roller held for rotation about a roller axis which is fixed relative to the door. Each roller axis extends generally horizontally and generally transverse to the track. Each track includes a first portion extending generally parallel to the aircraft fuselage and a second portion having a continuously curving transition to the first portion and extending partially inboard from the first portion. The second portion of the track guides the door into and out of the opening in the fuselage, allowing the door to achieve a substantially flush condition when in its closed position.

22 Claims, 10 Drawing Sheets

AIRCRAFT SLIDING DOOR SYSTEM

BACKGROUND OF THE INVENTION

1. Field of the Invention

This invention relates to an aircraft sliding door system, particularly advantageous for use in helicopters.

2. Description of the Related Art

A variety of door constructions have been utilized in helicopters. These include hinged doors and sliding doors. Common sliding doors such as those found on the UH-60 BLACK HAWK helicopter by Sikorsky Aircraft Corporation are mounted entirely external to the aircraft fuselage and fit over an opening in the fuselage when in a closed position. Such a door slides between open and closed positions on tracks. These tracks are located above and below the opening, are substantially parallel to the aircraft skin, and extend longitudinally beyond one side of the opening (e.g., beyond the rear side of the opening). In such a surface mount configuration, the outer surface of the sliding door still protrudes beyond the skin of the helicopter when in the closed position. Such a surface mount configuration has advantages of relatively light weight, ease of manufacture, and ease of maintenance. It has disadvantages as well. The projecting door interrupts airflow over the skin of the helicopter and thus creates aerodynamic drag. The airflow interruption also creates noise. The impact of these phenomena increases as the helicopter's speed increases. Additionally, certain uses of the helicopter may be more sensitive to these phenomena (e.g., use as a passenger helicopter vs. use as a military cargo helicopter). Such a surface mount configuration, with linear motion of the door parallel or nearly parallel to the fuselage, makes it difficult to provide an effective seal between the door and fuselage. The linear motion also presents radically different sealing conditions along the sides of the opening compared to along the top and bottom of the opening.

Another sliding door construction is used on the EH101 helicopter made by British Aerospace. This construction provides a flush closing door and features a pair of tracks extending longitudinally along the outside of the fuselage above and below the door opening. The door is carried along the tracks via pairs of upper and lower arms. The pairs of upper and lower arms respectively link the door to the upper and lower tracks. At one of its ends, each arm is pivotally connected to the door. At the other end, each arm is pivotally connected to a single rider on the associated track. When viewed from above, the door, arms, and rider form a parallelogram mechanism. In its closed condition, the door is recessed flush within the opening. The door is pulled outward to open, thus causing rotation of the arms relative to the door and riders in an articulation of the parallelogram mechanism. The door is pulled clear of the fuselage in this manner, whereupon the door, arms, and riders as a unit may be slid along the tracks to move the door into an open position wherein it does not block the opening. Closing of the door is performed in a reverse of this process.

As this type of flush-closing door approaches its closed position, movement of the door is substantially inward (i.e., nearly perpendicular to the opening). This allows for a smooth engagement of a seal circumscribing the opening (i.e., contact between the door and seal is close to straight-on, substantially compressive, and with little shear). However, providing a sufficient amount of compressive force to that seal is difficult. For a desired degree of sealing using a bulb-type seal, an advantageous normal closing force of about one pound per linear inch of seal is believed to be required. Where the door size is about five to six feet in height and two to three feet in width, between about fourteen and eighteen linear feet of seal is required. At one pound of closing force per linear inch, this would require someone pulling the door inward to apply a closing force of about 168–196 pounds. As such an amount of force is difficult to provide, a weaker, more flexible, seal material and/or configuration (i.e., one requiring a smaller closing force) is provided. Such a weak seal may not effectively resist water, air, and sound infiltration to the degrees which may be desirable. There is thus a need for an improved sliding door construction for an aircraft. Such an improved construction will advantageously provide both a flush-closing door and a strong seal under a wide variety of conditions without the need for an excessive applied closing force.

BRIEF SUMMARY OF THE INVENTION

Accordingly, one aspect of the invention is directed to a specific sliding aircraft door system. This door system includes a door carried by at least two tracks which have first portions extending generally along and parallel to the aircraft fuselage and second portions extending inward from the first portions. The door system also includes riders each bearing rollers to engage an associated one of the tracks. The rollers rotate about axes fixed relative to the door. As the door moves from an open to a closed position, the rollers move from the first portions to the second portions of their associated tracks as the door covers an increasing portion of its associated opening. As the rollers move to the second portions of their associated tracks, the door is guided inward to a substantially flush closed position.

Among the advantages of the inventions are the facilitation of the particular combination of: low weight; ease of opening and closing; low aerodynamic drag; low sound generation; good sound insulation, good sealing against water and air infiltration; and robustness.

In particular, with the rollers held on axes fixed relative to the door rather than being held on pivoting arms, a structurally sound, lightweight, door assembly is provided. The assembly is guided along the curved tracks, allowing the momentum of the door to contribute to an enhanced seal-compressing force.

The invention may be used in the context of a single door covering a single opening or where multiple doors cooperate to cover a single opening. With the door provided as a rigid assembly, it may be supported at three points such as by three riders on three of the aforementioned tracks. A pair of upper tracks may be provided with one of such tracks extending adjacent to the top of the opening in the fuselage. Only a single lower track may be present, located substantially aside the opening. This configuration leaves an area immediately below the closed position of the door unobscured by a track. With such a door as a first door, a second door may be located to cover an area of the opening below the bottom of the first door. Such a second door may be a hinged, fold-down style, "air stair" door carrying steps to assist passenger entrance and egress from the helicopter. Even in single-door configurations, the absence of a track adjacent the bottom of the door opening increases utility, allowing greater flexibility in the use of accessories such as ramps, winches, and the like, which need to occupy the space adjacent the bottom of the opening.

Another aspect of the invention is directed to a door system having an upper door movable between open and closed positions via a substantially longitudinal translation along the fuselage. A lower door is movable between open and closed positions via a substantially transverse movement. In their closed positions, the upper and lower doors in combinations seal an opening in the fuselage. The lower door may have first and second sides, the first side oriented facing exterior to the aircraft when the lower door is in its closed position. The second side faces interior to the aircraft when the lower door is in its closed position and, when the lower door is in its open position, faces partially upward and includes stairs which are positioned for ascent and descent by users to enter and exit the aircraft.

These and other aspects of the present invention will be readily apparent upon reading the following detailed description of the invention, as well as the drawings and the claims.

BRIEF DESCRIPTION OF THE DRAWINGS

Like reference numbers and designations in the several views indicate like elements.

DETAILED DESCRIPTION OF THE INVENTION

Figure 1:
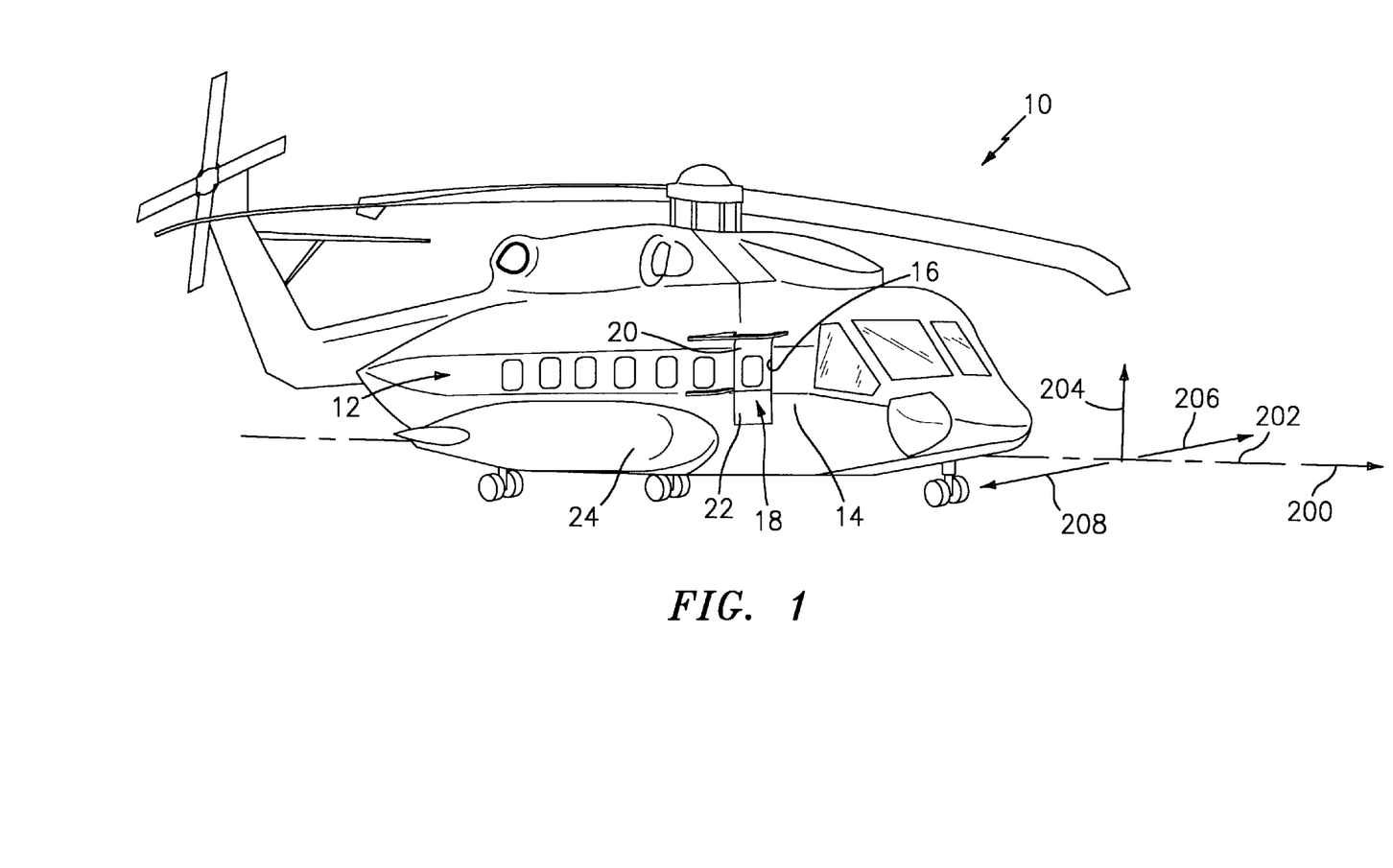
FIG. 1 is a view of a helicopter having a door system according to principles of the invention.

FIG. 1 shows an aircraft 10 having a fuselage 12 including a skin 14. In the exemplary embodiment, the aircraft is a rotary wing aircraft (e.g., a helicopter). With reference to the aircraft in a level, upright, orientation, a forward direction 200 is shown along a longitudinal axis 202. An upward direction 204 is shown transverse to the axis 202 as are leftward and rightward directions 206 and 208. An opening or port 16 in the fuselage extends between the interior and the exterior of the aircraft. A door 18 is provided to selectively seal the opening. In the exemplary embodiment, the door 18 includes an upper half ("upper door") 20 and a lower half ("lower door") 22.

Figure 2:
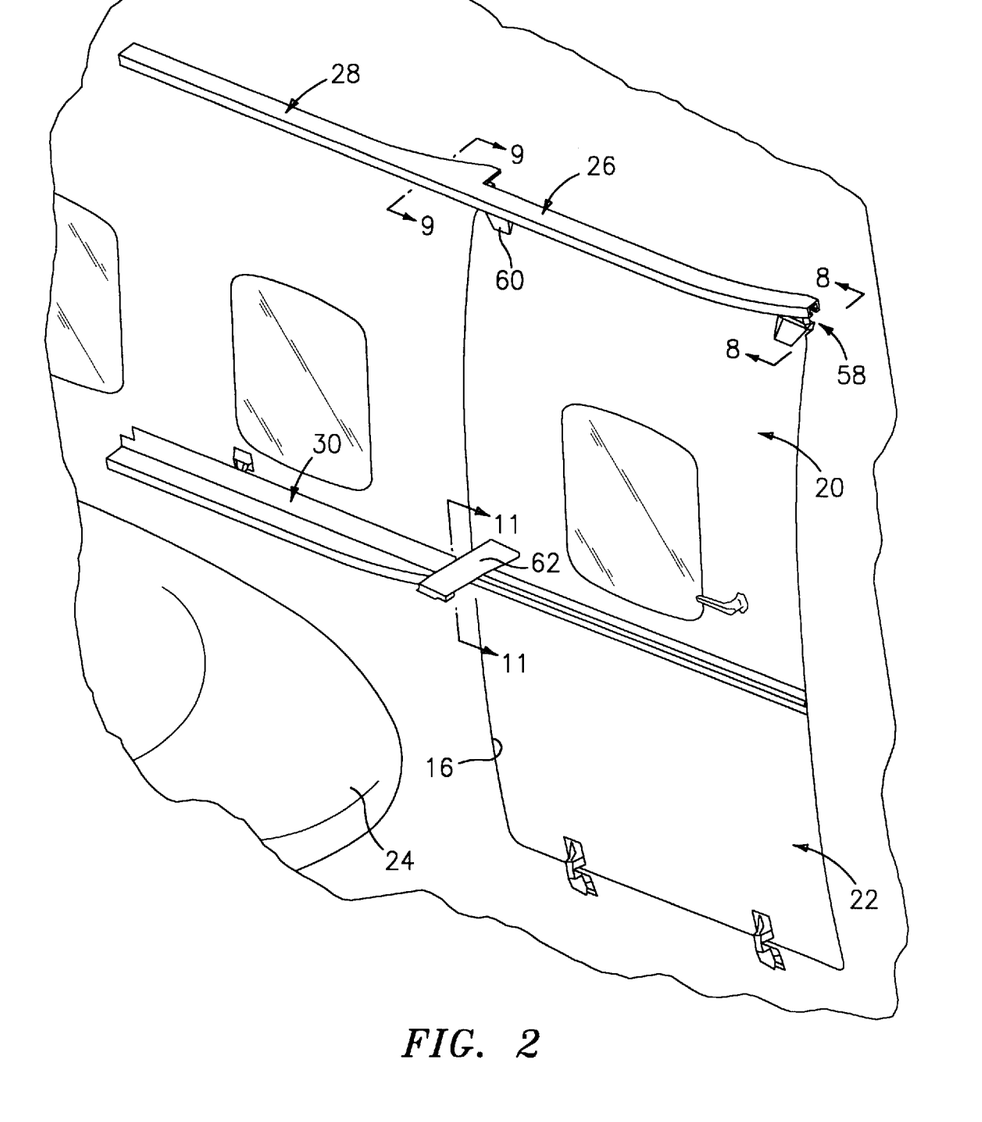
FIG. 2 is a partial view of the door system of the helicopter of FIG. 1 shown in a closed condition.

The doors 20 and 22 may be moved to closed positions shown in FIG. 2. In their closed positions, the doors 20 and 22 combine to block and substantially seal the opening 16, the upper door 20 blocking an upper portion thereof and the lower door 22 blocking a lower portion thereof. In the exemplary embodiment, the splitting of the door 18 into upper and lower doors 20 and 22 facilitates accommodation of a fuel sponson 24. The upper door can open longitudinally over the sponson 24 while the lower door opens transversely in front of the sponson.

The upper door 20 is moveable along a door path between to its closed position (FIG. 2) from its open position (FIG. 3) via a movement consisting essentially of a translation guided by tracks 26, 28, and 30. With reference to movement from the open position (FIG. 3) to the closed position (FIG. 2), the door path (shown in FIG. 4) has a first (aft), substantially straight, longitudinal portion 250, extending forward from an aft end of the door path. A second (forward) portion 252 of the door path extends forward and inward to a forward end of the door path. The forward portion 252 includes a continuously curving transition 254 to the aft portion 250. This path allows for a smooth movement between the open position (FIG. 3) wherein the upper door 20 is alongside the fuselage and the closed position (FIG. 2) wherein the upper door 20 extends into the opening 16 in a flush relationship to the fuselage.

Figure 3:
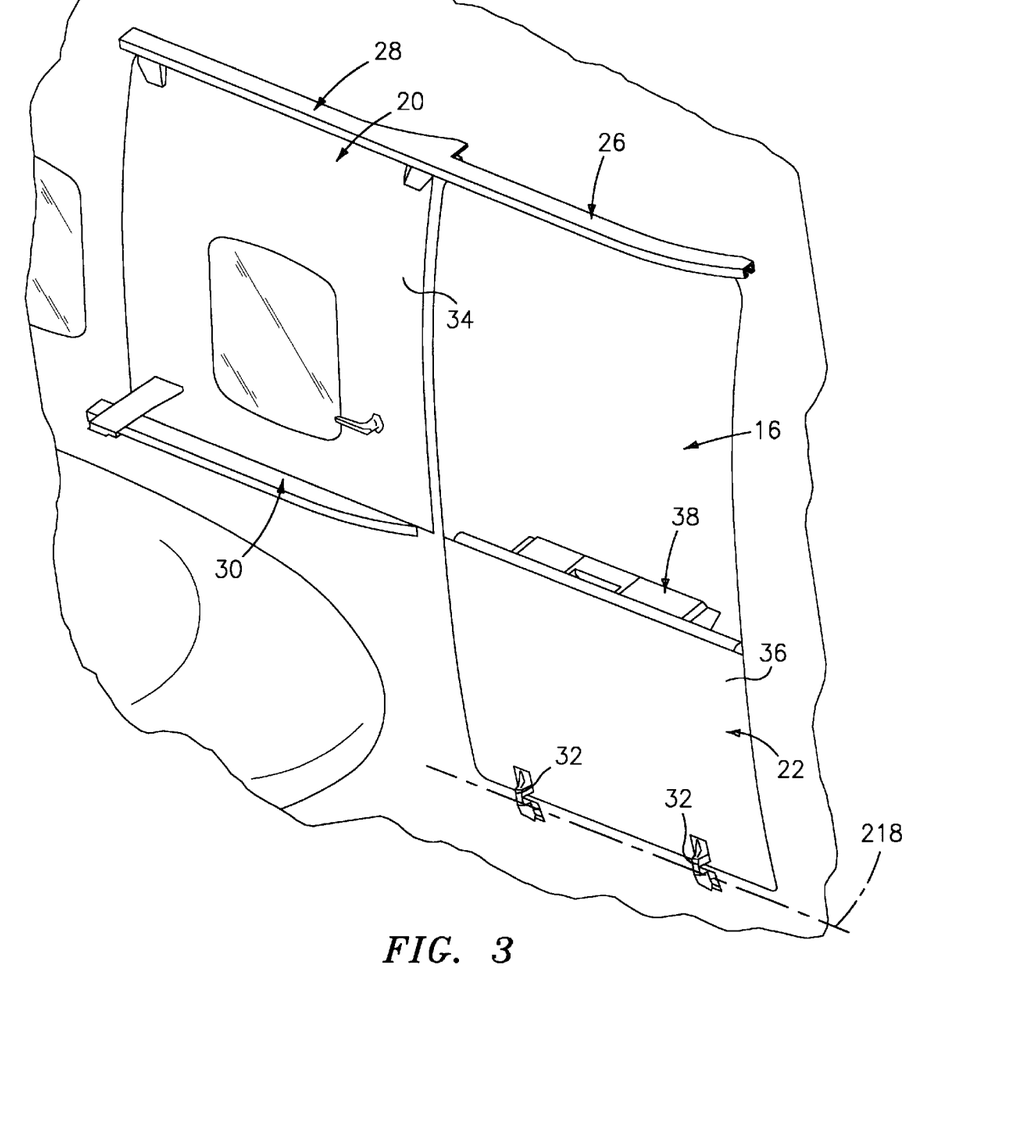
FIG. 3 is a partial view of the door system of FIG. 2 with an upper door shown in an open position and a lower door shown in a closed position.
Figure 5:
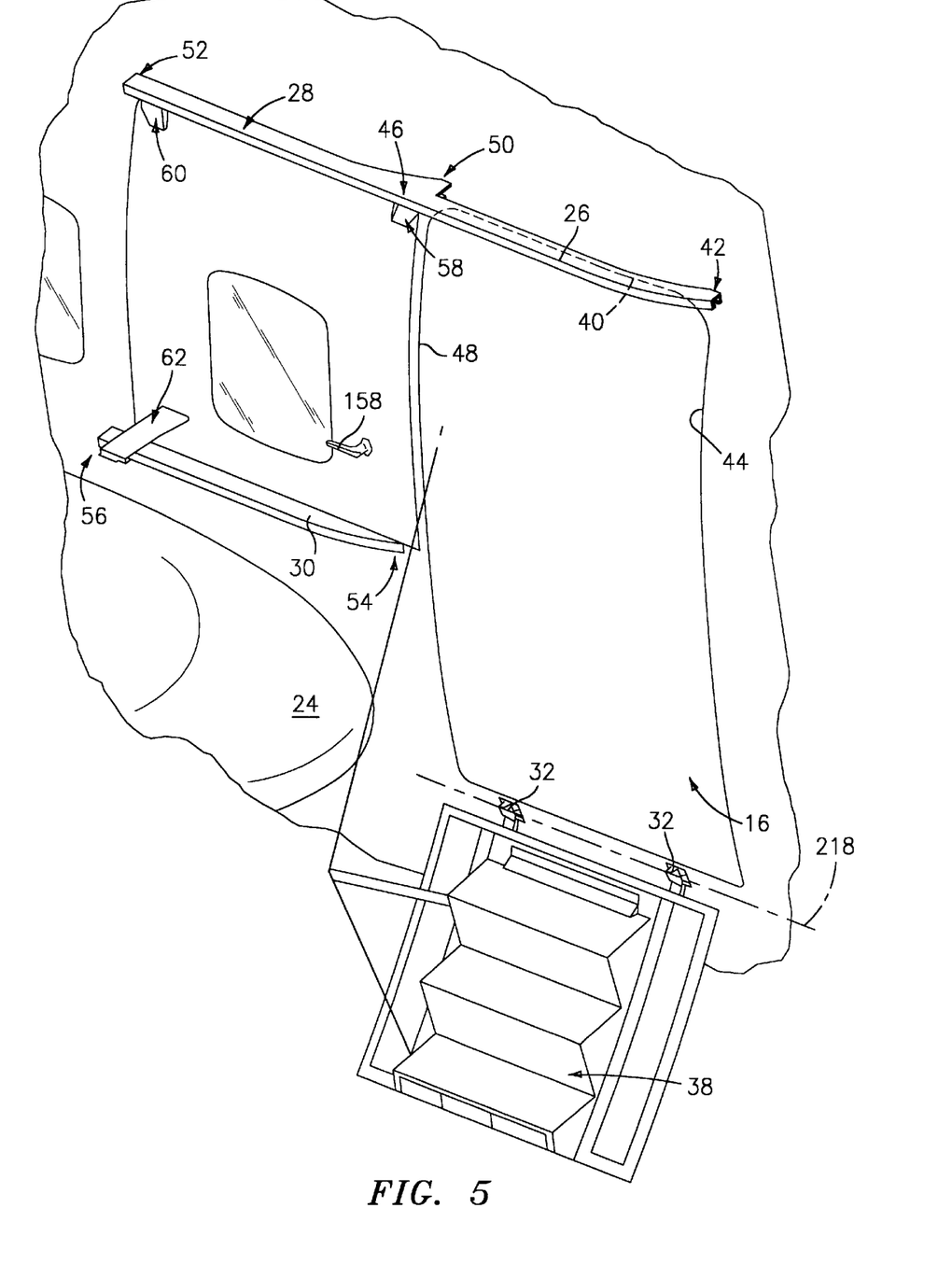
FIG. 5 is a partial view of the door system of FIG. 2 with both the upper and lower doors in open positions.

In the exemplary embodiment, the lower door 22 is mounted to the fuselage 12 via a pair of hinges 32 (FIG. 3). With the upper door 20 in its open position, the lower door 22 may be moved from its closed position (FIG. 3) to its open position (FIG. 5). Movement of the lower door between its open and closed positions is substantially via a rotation guided by the hinges 32. The hinges 32 may be fixed-axis hinges which allow the lower door to pivot about a single fixed axis 218 locally parallel to the fuselage. Alternatively, the hinges 32 may be multi-link hinges wherein the axis of rotation moves during transition of the lower door between its open and closed positions.

In the exemplary embodiment, each of the upper and lower doors 20 and 22 is approximately rectangular, having a slight surface curvature to match the surface curvature of the fuselage when the doors are in their closed positions and having rounded upper and lower corners, respectively, to accommodate the rounded comers of the opening 16. The upper and lower doors have exterior sides defined by the exterior surfaces of the doorskins 34 and 36 respectively. In their closed positions, the upper and lower doors 20 and 22 are substantially flush with the fuselage, the doorskins 34 and 36 and fuselage skin 14 forming a substantially continuous aerodynamic structure, the doorskins having no substantial protrusion beyond a curved surface defined by the fuselage skin. By way of example, in the vicinity of the edges of the doorskins 34 and 36, their outer surfaces are no more than about one eighth of an inch offset inboard or outboard of the adjacent outward facing surface of the fuselage skin 14. An interior side of the lower door 22 includes stairs 38 (FIG. 5). The stairs 38 are fixed within the lower door 22. With the lower door 22 in its open position, the stairs 38 are positioned for ascent and descent by human users to respectively enter and exit the aircraft. In alternative embodiments, the stairs may articulate between a relatively compact stowed condition and a deployed condition. Transition between stowed and deployed conditions may be coupled to movement of the lower door between its closed and open positions.

Figure 6:
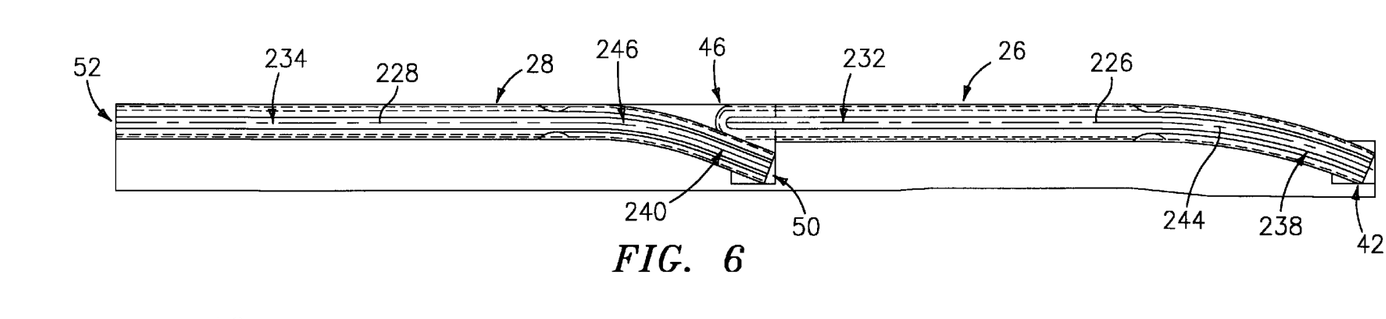
FIG. 6 is a bottom view of a pair of upper tracks of the door system of FIG. 2.

As shown in the bottom view of FIG. 6, the fore and aft upper tracks 26 and 28 are components of a single unit which is then secured to the fuselage such as by bolts (not shown). In the exemplary embodiment, the fore and aft upper tracks 26 and 28 are unitarily formed in a single milling of aircraft aluminum. The lower track 30 (FIG. 7) is part of separate unit secured to the fuselage. With the tracks so assembled to the fuselage, the fore track 26 extends along the fuselage generally proximate to a top 40 of the opening 16 (FIG. 5). Specifically, the fore track 26 is located slightly above the top 40 (e.g., by a few centimeters) and extends from a forward end or terminus 42 approximately longitudinally even with a forward side 44 of the opening 16 to an aft (rear) end or terminus 46 slightly beyond (aft of) the aft side 48 of the opening 16.

The aft (rear) upper track 28 is at a height substantially even with the fore upper track 26 as described in further detail below. The aft upper track 28 extends from a forward end or terminus 50 located substantially even with the aft side 48 of the opening 16 so that the fore terminus 50 is slightly inboard and ahead of the aft terminus 46 of the fore upper track 26. The aft upper track 28 extends to an aft end or terminus 52 which is approximately one door width beyond the aft side 48 of the opening 16.

Figures 7, 12:
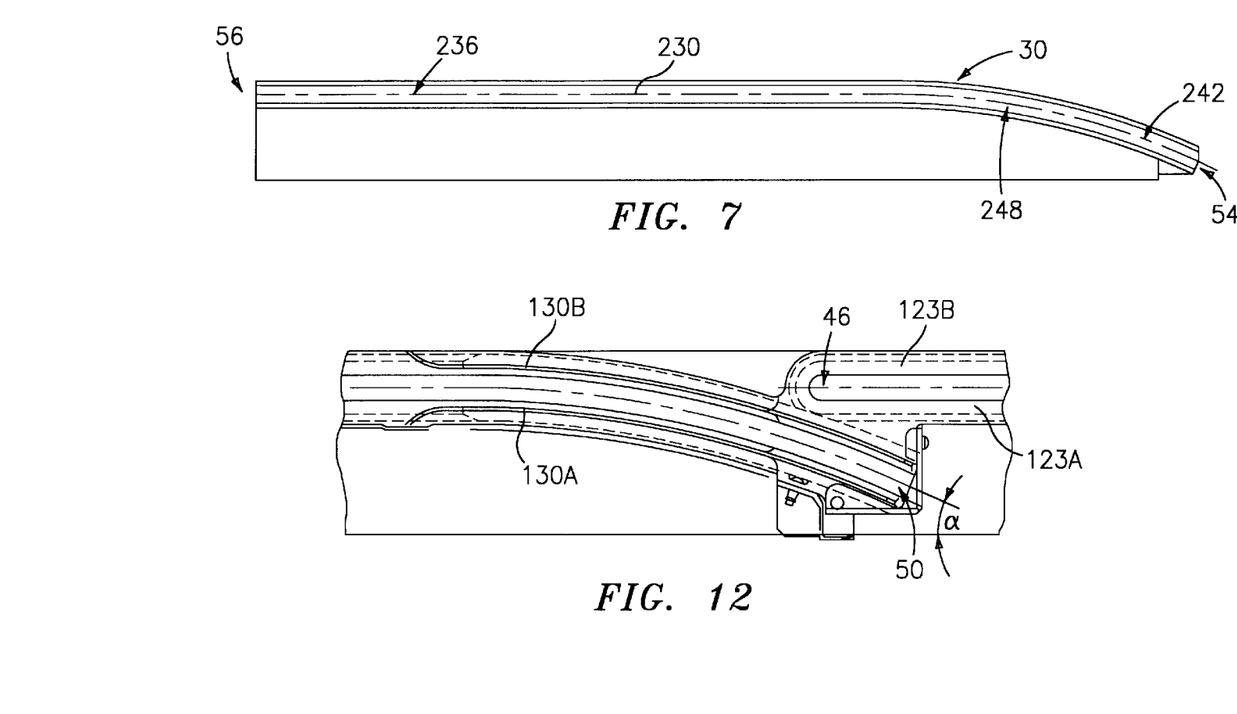
FIG. 7 is a bottom view of a lower track of the door system of FIG. 2.
FIG. 12 is an enlarged partial view of a fore portion of an rear one of the tracks of FIG. 6.

The lower track 30 is at a longitudinal location substantially even with the aft upper track 28. The lower track 30 extends from a forward end or terminus 54 slightly beyond the aft side 48 of the opening 16 to an aft end or terminus 56. The lower track 30 is located slightly below the height of the bottom of the upper door 20.

Three riders 58, 60, 62 are carried by the upper door in engagement with the three tracks 26, 28, and 30, respectively. Each of the fore and aft upper riders 58 and 60 includes a base 64 (FIGS. 8 and 9) secured to the door such as by bolts. A roller system extends upward from the top of the base 64. As shown in FIG. 10, each roller system includes a stud 66 extending upward from the base 64. The stud 66 has a central longitudinal axis 220 which is oriented substantially vertically. In the exemplary embodiment, the stud 66 has a threaded lower (proximal) end engaged to a threaded bore in the base 64 and is secured by a locking nut and washer assembly 68. At its upper (distal) end, the stud 66 carries an axle or shaft 70 having a central longitudinal axis 222 which is perpendicular to and intersecting the stud axis 220. On opposite inboard and outboard sides of the stud 66, the axle 70 carries inboard and outboard rollers 72A and 72B. The rollers 72A and 72B are held via roller bearings 74 by the axle 70 for rotation about the axle axis 222 which is thus a roller axis. At inboard and outboard ends of the axle 70, the axle has a head 76 and carries a locknut 78 respectively. The head and locknut in combination hold the axle 70 and rollers 72A and 72B against movement along the axle axis 222.

The rollers 72A and 72B are formed of a roller material (stainless steel, in the exemplary embodiment). Each roller 72A and 72B has a cylindrical outer surface portion 80 symmetric about and along the axle axis 222 and an annular side portion 82 parallel to facing outward relative to the stud axis 220 and joined to the outer surface portion 80 via a continuously curving portion 84.

An additional roller 88 is carried by the stud 66 via a roller bearing 90 which allows the roller 90 to rotate about the stud axis 220. The roller 88 has a cylindrical outer surface portion 92 symmetric both about and along the stud axis 220. The roller 88 is held at a substantially fixed location along the stud axis 220.

FIG. 11 shows details of the rider 62 associated with the lower track 30. The rider includes a bracket 94 having an upper portion 95 secured to the door 20 adjacent to the lower rear corner of the door. The bracket 94 includes a lower portion 96 extending downward and outward from the upper portion 95. At the bottom of the lower portion 96, an inwardly-directed flange 98 carries a roller 100. Specifically, a shaft 102 extends vertically through a hole in the flange 98. The shaft has a central longitudinal axis 224. A roller bearing 104 couples the roller 100 to the shaft 102 for rotation about the shaft axis 224. At upper and lower ends of the shaft 102, the shaft has a head 106 and carries a locknut 108, respectively. The head and locknut in combination hold the shaft 102 and roller 100 against movement relative to the bracket 94 along the shaft axis 224. The roller 100 may be similarly constructed and dimensioned to the rollers 72A and 72B, but oriented to have a vertically extending cylindrical outer surface portion 110.

Returning to FIGS. 8 and 9, a cross-sectional profile of the fore and aft upper tracks 26 and 28 is seen. Each track 26 and 28 defines a downwardly-open channel. Each track 26 and 28 has a downward facing slot-like opening 120 and 122, respectively (FIG. 9). On either side of the opening 120, a pair of flanges 123A and 123B extend inward to define the opposite sides of the opening, the inboard and outboard flanges having respective flat upward-facing surfaces 124A and 124B. Similarly, the aft upper track 28 has inboard and outboard flanges 125A and 125B having flat upward-facing surfaces 126A and 126B and defining opposite sides of the opening 122. For the respective riders 58 and 60, their associated inboard roller 72A is located in rolling engagement with and supported by the inboard flange 123A via its surface 124A and inboard flange 125A via its surface 126A, respectively. For each of the riders 58 and 60 their outboard roller 72B is similarly engaged to and supported by the outboard flanges 123B and 125B and their associated surfaces 124B and 126B, respectively.

As shown in FIGS. 6 and 7, each of the tracks has the same general shape to the extent that, during movement of the upper door between open and closed positions, the riders engaging each of the three tracks moves along an identically shaped roller path 226, 228 and 230. Each track 26, 28 and 30 and its associated roller path 226, 228 and 230 has an aft portion 232, 234 and 236 extending from the aft terminus of such track. The aft portion constitutes a majority of the track and extends generally parallel to the fuselage. In the exemplary embodiment, the aft portion is straight and extends along approximately 70% of the length of the track (about 50% to 80% being a preferred range). A forward portion 238, 240 and 242 of the track and path extends aft from the forward end of the track to the associated aft portion. In the exemplary embodiment, the fore portion is nearly straight in region adjacent the forward terminus of the track and has a continuously curving transition 244, 246 and 248 to the aft portion. Each fore portion thus extends partially inboard from the associated aft portion and at the forward terminus achieves an acute angle α (FIGS. 4 and 12) relative to the aft portion. In the exemplary embodiment, the angle α is about 22°. A broader range of angles from about 15° to about 30° is likely acceptable with a narrower range of 20° to 25° preferred.

Figure 8:
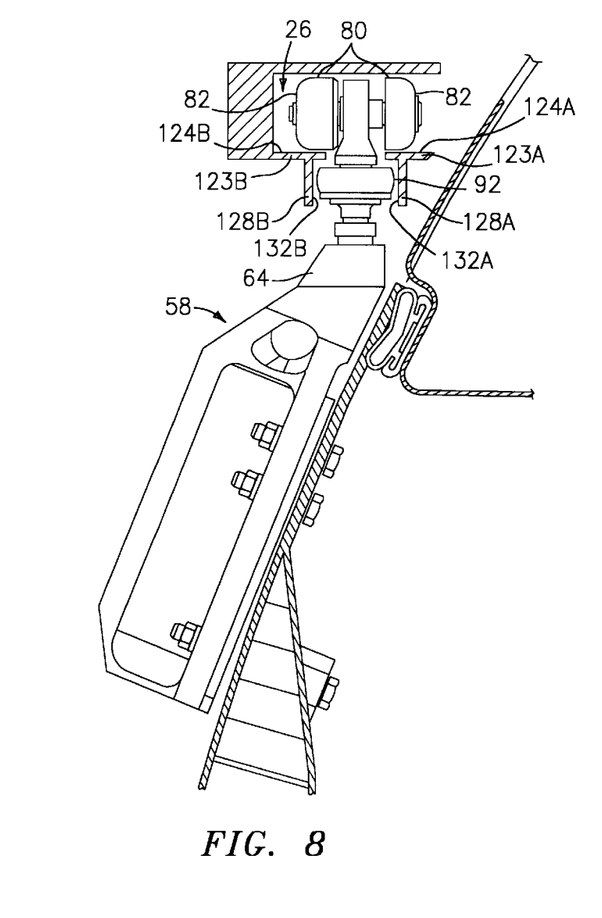
FIG. 8 is a longitudinal view of a rider engaged to a fore upper track of the door system of FIG. 2.
Figure 9:
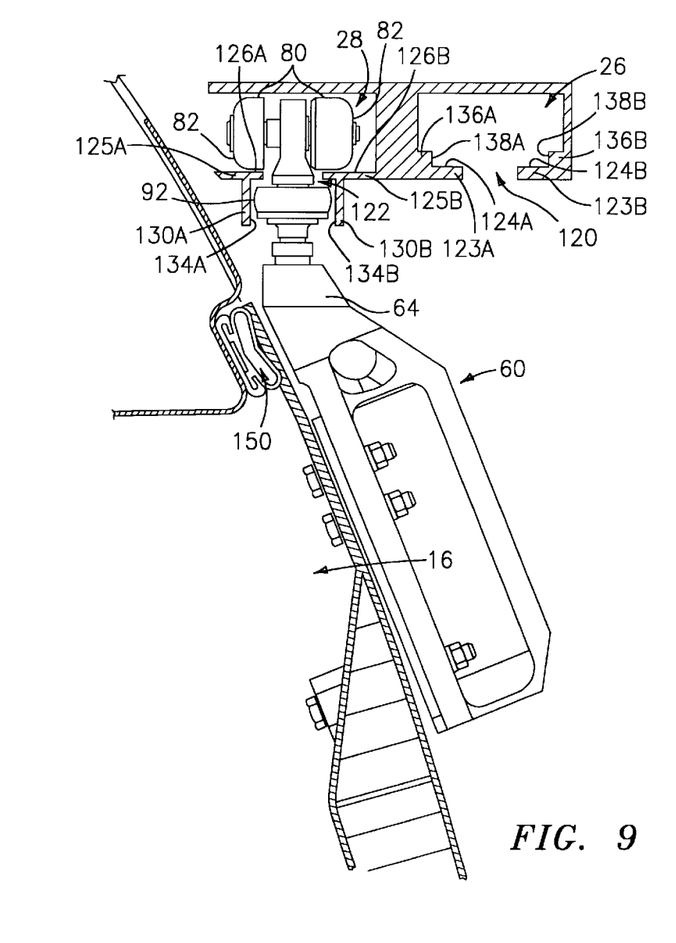
FIG. 9 is a partial longitudinal view of a rider engaged to an aft upper track of the door system of FIG. 2.
Figures 10, 11:
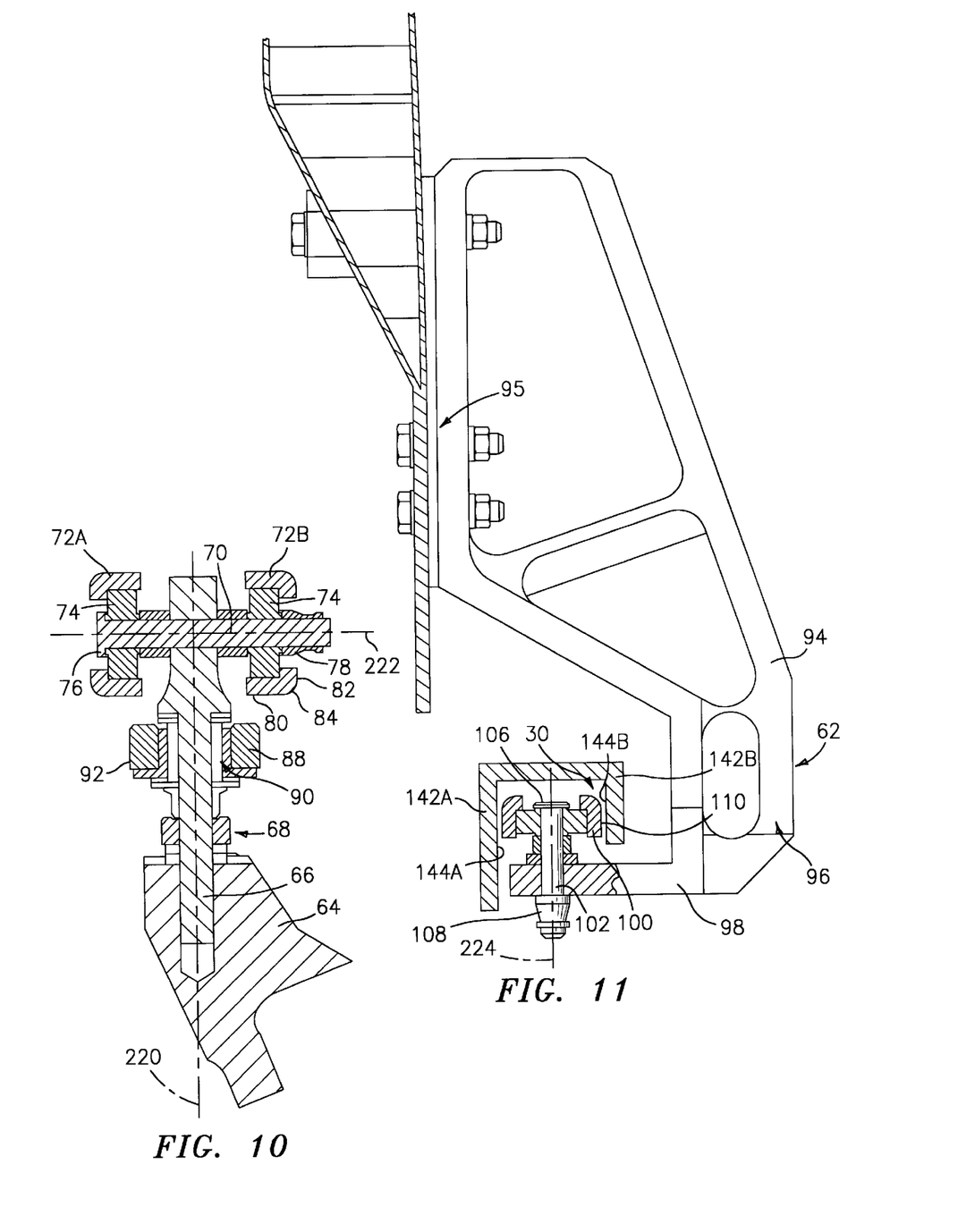
FIG. 10 is a partial longitudinal cross-sectional view of a rider engagable with an upper track of the door system of FIG. 2.
FIG. 11 is a longitudinal view of a rider engaged to a lower track of the door system of FIG. 2.

As shown in FIGS. 8 and 9, along the fore portions 238 and 240 of the tracks 26 and 28, there depends from the undersides of the pairs of flanges 123A, 123B and 125A, 125B respective guide walls 128A, 128B and 130A, 130B. The guide walls 128A, 128B and 130A and 130B respectively have vertical surfaces 132A, 132B, 134A and 134B facing inward relative to the channel defined by the associated track. As shown in FIG. 12 (for the walls 130A and 130B), proximate the transition between the fore portion and aft portion of the associated track, the walls 128A, 128B, 130A and 130B flare laterally outward relative to the track and channel it defines.

As shown in FIG. 9 relative to the fore upper track 26, along its aft portion 232, the track has inboard and outboard shoulders 136A and 136B, respectively. The shoulders 136A and 136B extend inward above the respective flanges 123A and 123B and have a vertical inward-facing surface 138A and 1318B joining the upper surfaces 124A and 124B of the flanges at right angles. The aft upper track 28 bears similar shoulders along its aft portion 234.

As shown FIG. 11, the lower track 30 is formed as a downward facing right channel having inboard and outboard sidewalls 142A and 142B. The sidewalls 142A and 142B have respective inner surfaces 144A and 144B.

When the upper door 20 is in its open position, the riders 58 and 60 and their associated rollers are located respectively adjacent the aft ends 46 and 52 of the fore and aft tracks 26 and 28. As shown in FIG. 12, the aft terminus 46 of the track 26 is closed; the flanges 123A and 123B joining at a rounded end 146. The aft terminus 52 of the track 28 is open (FIG. 6). Contact between the roller assembly 64 of the rider 58 and the closed aft end 46 of the track 26 prevents rearward movement of the upper door 20 beyond the open position.

From the open position, a user may draw the upper door 20 forward toward the closed position. Force applied by the user to the door allows the rollers 72A and 72B of each of the riders 58 and 60 to roll along the tracks 26 and 28. To support the weight of the upper door 20 and retain it vertically, the surfaces 80 of the rollers are in rolling engagement with the surfaces 124A, 124B, 126A and 126B of the associated track flanges (FIGS. 8 and 9). As the upper door moves forward along the aft portion of its path, the riders 58 and 60 are retained transversely relative the tracks 26 and 28 by contact between: (a) the annular side portions 82 of the external surfaces of the rollers 72A and 72B; and (b) the adjacent surfaces 138A and 138B of the shoulders 136A and 136B. The distance between the annular side portions 82 of adjacent rollers 72A and 72B in a given rider is slightly less than the distance between adjacent surfaces 138A and 138B of the shoulders 136A and 136B. Thus there is a slight lateral play when the riders 58 and 60 are located along the aft portions of the tracks 26 and 28, respectively.

Additionally, the diameter of the roller 100 (FIG. 11) at its cylindrical surface 110 is slightly less than the width of the track 30 between the surfaces 144A and 144B. Thus, the roller 100 can contact only one of those surfaces at a given time. As the upper door 20 moves forward along the aft portion of the track, the rider 62 is retained transversely relative to the track 30 by contact between surface 110 of the roller and the surfaces 144A and 144B of the track 30. The rider 62 carries substantially none of the weight of upper door 20.

As the upper door 20 proceeds toward its closed position (e.g. forward in the exemplary embodiment) the riders 58, 60 and 62 eventually reach the continuously curving transitions 244, 246 and 248 at the aft ends of the forward portions 238, 240 and 242 of the tracks 26, 28 and 30. At this point, on each of the upper tracks 26 and 28, the cylindrical outer surface portion 92 of the associated roller 88 can come into contact with the outboard vertical surfaces 132B and 134B of the respective guidewalls 128B and 130B. The contact pushes the upper door 20 inward along its path of travel. Since the three tracks have an identical shape, the upper door 20 maintains a fixed orientation during its travel between open and closed positions. This produces a slip angle between the rollers 72A and 72B of each of the riders 58 and 60 and their associated tracks 26 and 28 as the riders move onto the fore portions of such tracks. Slip angle is the angle by which the roller axis is off perpendicular to the local path of the door.

In the exemplary embodiment, the roller/axle axes 222 are perpendicular to the adjacent portion of the roller paths 226 and 228 while the rollers are along the straight aft portions 232 and 234 thereof. Since the door has a constant orientation, the slip angle for the rollers 72A and 72B along each of the tracks 26 and 28 is simply the angle between: (a) the tracks at the particular location; and (b) the aft portion 232 and 234 of the tracks.

Figure 4:
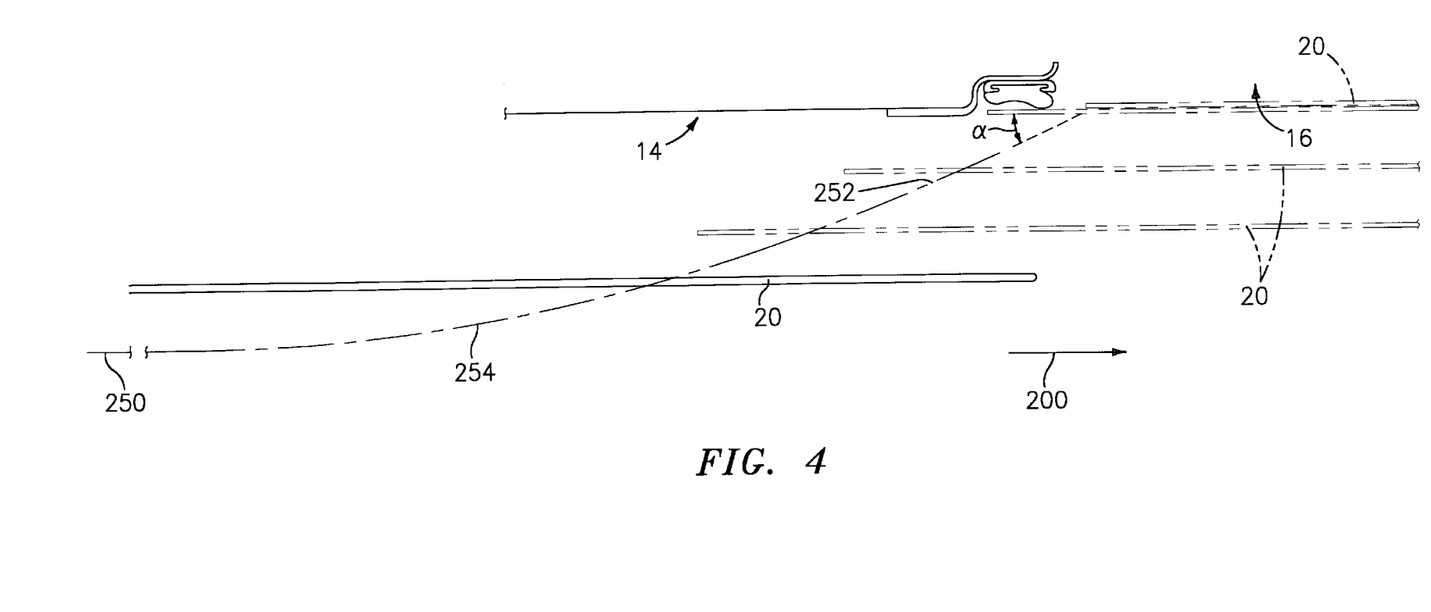
FIG. 4 is a partial top cross-sectional view of the upper door of FIGS. 2 and 3 shown in various stages of movement between open and closed positions.
Figure 13:
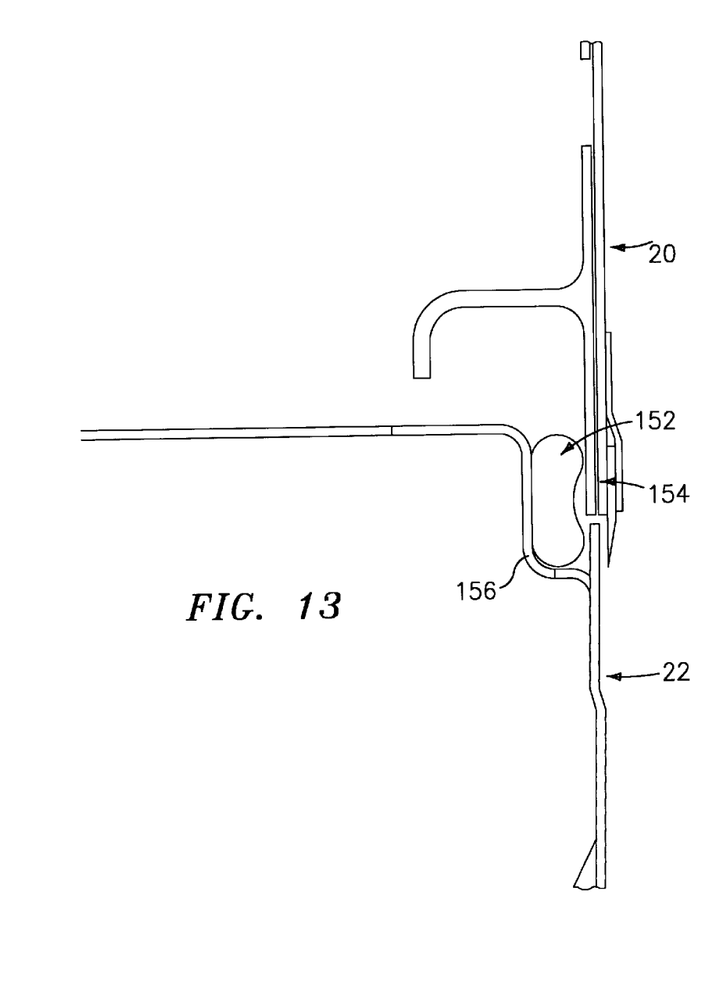
FIG. 13 is a partial longitudinal cross-sectional view of the upper and lower doors of FIG.2.

As shown in FIG. 4, the door proceeds forward and inward toward its closed position making its terminal approach at the aforementioned angle α of about 22°. In the terminal approach, the upper door 20 contacts and compresses a bulb seal 150 (FIG.9). The bulb seal 150 is mounted in the doorjamb facing outward and extending entirely around the opening 16. An upper portion of the seal 150 is thus engaged by the upper door 20 while a lower portion is engaged by the lower door 22. Additionally, as shown in FIG. 13, a lowermost strip 154 of the upper door 20 compresses a second bulb seal 152 mounted in a recess in the lower door 22 extending along an uppermost strip 156 at the upper edge of the lower door.

The bulb seals 150 and 152 are outwardly convex in their relaxed conditions but, when engaged by the doors 20 and 22 into a compressed condition, become outwardly concave, engaging the associated door along two lines of contact and, thereby, providing an effective seal against water, air and sound infiltration.

Figure 14:
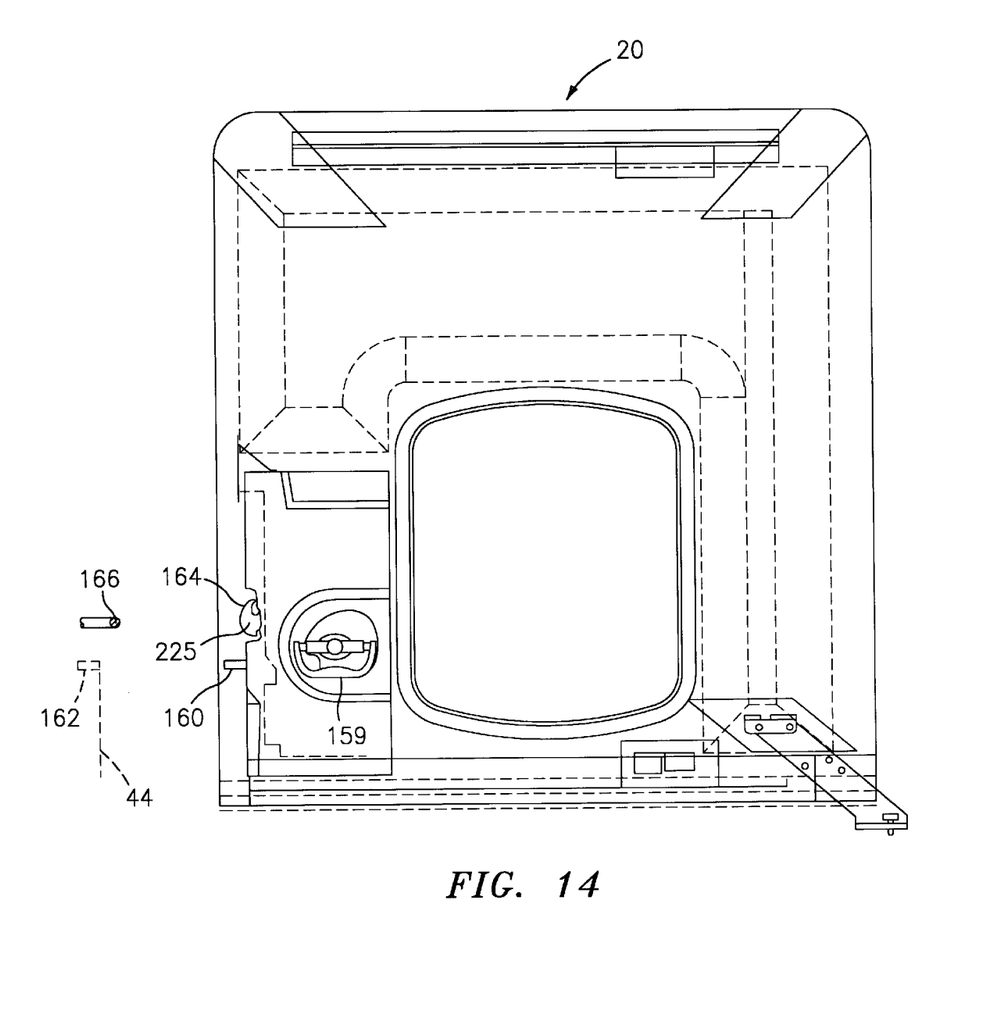
FIG. 14 is an inboard view of the upper door of FIG. 2.

The upper door 20 includes a latching mechanism which may be accuated by an exterior handle 158 (FIG. 5) and a corresponding interior handle 159 (FIG. 14). It is an advantage of the present invention that the cooperation between the riders and their associated tracks allows for a relatively compact and lightweight latching mechanism. The latching mechanism selectively secures the upper door to the fuselage in a small area in the lower front quadrant of the door (the quadrant in which there is no track-engaging rider). Combined with the latching mechanism, engagement of riders with the tracks is effective to maintain the upper door in the closed position against expected internal or external forces tending to force the door outward. With the upper and lower doors in their closed positions, in the exemplary embodiment the lowermost strip 154 of the upper door 20 overlaps the uppermost strip 156 of the lower door and is engaged thereto via the seal 152 (FIG. 13). Any outward pressure tending to open the lowermost door merely compresses the seal 152, the lowermost strip and uppermost strip cooperating to prevent water intrusion. When the upper door is in its closed position, interference between the upper and lower doors supplements lower door latches (not shown) to prevent opening of the lower door.

The latching mechanism includes a pin 160 (FIG. 14) carried by the upper door 20. The pin selectively cooperates with a socket 162 in the door jamb of the fuselage (FIG. 5). The pin extends generally parallel to the door path at the forward end of such door path. With the pin extended into the socket, they cooperate to resist outward flexing of the door at the lower front quadrant thereof. The pin does not resist opening of the door due to force pulling the door along the door path toward the open position. To resist opening, the latching mechanism includes a rotating hook 164 (FIG. 14) which cooperates with a fixed transverse bar 166 carried within the jamb. When the door is brought to the closed position, rotation of the door handle(s) rotates the hook 164 around and into engagement with the bar 166. The hook rotates about an axis 225 substantially perpendicular to a plane defined by the door and to the straight aft portion of the door path. The bar 166 extends generally parallel to the hook axis 225. This combination of latching elements is particularly advantageous to maintain the upper door firmly in the closed position with minimal play.

To open the door, one of the handles is rotated to disengage the hook from the bar. At this point, the user applies force to move the upper door 20 from its closed position to its open position. The slight initial rearward movement of the upper door 20 brings the outer cylindrical surfaces 92 of the rollers 88 of the respective rider 58 and 60 into contact with the respective surface 132A and 134A of the inboard vertical guidewall 128A and 130A of the respective fore and aft tracks 26 and 28. Such contact pushes the upper door 20 outward along its path of travel. As further force is applied, the relatively low angle α provides a force magnification which breaks any adhesion between the seals and the upper door (as it similarly provided a force magnification to compress the seals upon closing). The upper door 20 is then free to slide until it reaches its open position. With the upper door 20 in its open position, the lower door 22 is free to be rotated from its closed position to its open position.

The approach of the door to the opening at the angle α provides for enhanced seal compression and, thereby, enhanced sealing against water, air and sound infiltration. With the exemplary value of α at 22°, a closing force applied to the door longitudinally (e.g. parallel to the aft portion of the door path) produces a normal force compressing the seal which is magnified by a factor of the cotangent of the angle α. Thus, for a 22° approach, the normal force compressing the seal is about 2.5 times the longitudinal force applied. This force magnification is combined with the efficient use of the door's momentum in compressing the seals. With the latching mechanism configured as a slam latch, the hook 164 can lock the upper door 20 in its closed position before the upper door rebounds out of engagement with the seals. With values of α much higher than those described, the force magnification and efficient use of momentum can be lost. With much lower (shallower) angles, there may be excessive stretching and shearing of seals as well as an increased discontinuity between the door and fuselage skins. Furthermore, lower angles require increased clearance between the door and jamb. Such clearance may be taken from the door, from the jamb, or in combination. Provision of the extra clearance may compromise structural integrity, increase aerodynamic drag, increase noise, and the like.

Although one or more embodiments of the present invention have been described, it will nevertheless be understood that various modifications may be made without departing from the spirit and scope of the invention. For example, although shown applied to a door system having upper and lower doors, principles of the invention may be applied to systems including either a single door or multiple doors closing a single opening. Although a fold-down lower door has been described, other configurations wherein a lower door moves transversely (e.g., in a circumferential retraction into the fuselage) are also possible, as are constructions wherein the lower door moves longitudinally or otherwise. Accordingly, other embodiments are within the scope of the following claims.

What is claimed is:

1. A system for bearing the weight of an aircraft door and guiding the door along a door path between an open position and a closed position comprising:
    a track;
    a rider carried by the door in engagement with the track and moveable along a length of the first track between first and second positions as the door moves between its respective open and closed positions, the rider including at least a first roller held for rotation about a first roller axis fixed relative to the door and in rolling engagement with the track for supporting the door, the first roller axis extending generally horizontally and generally transverse to the track, wherein the track comprises:
    a first portion, extending along a majority of the length, and extending generally parallel to the fuselage; and
    a second portion having a continuously curving transition to the first portion and extending partially inboard from the first portion toward the second position of the rider along the track.

2. The system of claim 1 wherein the first roller assumes a generally higher slip angle relative to the track during movement of the first roller along the second portion than during movement of the first roller along the first portion.

3. The system of claim 2 wherein the rider further comprises:
    a second roller held for rotation about a second roller axis fixed relative to the door and in rolling engagement with the track for laterally guiding the door.

4. The system of claim 3 wherein the rider further comprises:
    a stud holding the first and second rollers, the stud extending upward from the door through the second roller to the first roller; and
    a third roller held by the stud for rotation about the first roller axis and in rolling engagement with the track for supporting the door, the first and third rollers on respective inboard and outboard sides of the second roller axis.

5. The system of claim 4 wherein the first roller axis and second roller axis are perpendicular and intersecting.

6. The system of claim 4 wherein a portion of the door path extending from the closed position is oriented at an angle of from between about 20 degrees to about 25 degrees off parallel to the first portion of the track.

7. A door system for selectively closing an opening in an aircraft fuselage, the opening having a top, a bottom and fore and aft sides, the system comprising:
    at least a first door moveable between an open position and a closed position;
    a first track, secured to the fuselage and located generally proximate the top of the opening;
    a first rider carried by the first door in engagement with the first track and moveable along the first track between first and second positions as the first door moves between its respective open and closed positions;
    a second track, secured to the fuselage and located substantially aside of the opening, aside a first of the fore and aft sides and located at a height proximate the top of the opening;
    a second rider carried by the first door in engagement with the second track and moveable along the second track between first and second positions as the first door moves between its respective open and closed positions;

a third track, secured to the fuselage and located substantially aside the first of the fore and aft sides of the opening and located at a height below a longitudinal bottom edge of the first door; and a third rider carried by the first door in engagement with the third track and moveable along the third track between first and second positions as the first door moves between its respective open and closed positions, wherein during movement of the first door between its open and closed positions, substantially the entire weight of the first door is borne by one or both of the first and second tracks.

8. The system of claim 7 wherein each of the first, second and third tracks comprises:

a first portion, constituting a majority of its track, and extending generally parallel to the fuselage; and a second portion having a continuous curving transition to the first portion and extending partially inboard from the first portion toward the second position of the associated rider along the track, so that during movement of the door from the open position to the closed position:

the first, second and third riders move along the first portion of the respective first, second and third tracks as the door moves longitudinally, covering an increasing proportion of the opening; and the first, second and third riders then move along the second portion of the respective first, second and third track, as the door moves longitudinally and transversely into the opening so that in the closed position a portion of the door extends transversely into the opening and an outer surface of the door is substantially flush with the fuselage.

9. The system of claim 7 wherein each of the first and second riders comprises:

a pair of rollers held for rotation about a roller axis fixed relative to the door, and in rolling engagement with the track for supporting the door, the roller axis extending generally horizontally and generally transverse to the track and the rollers substantially fixed along said roller axis.

10. A door system for selectively closing an opening in an aircraft fuselage, the opening having a top, a bottom and fore and aft sides, the system comprising:

(a) an upper door moveable between a closed position in which the upper door blocks an upper portion of the opening and an open position in which the upper door is substantially clear of the upper portion;

(b) a lower door moveable between a closed position in which the lower door blocks a lower portion of the opening and an open position in which the lower door is substantially clear of the lower portion; and having:

(i) a first side, oriented facing exterior to the aircraft when the lower door is in its closed position;

(ii) a second side, oriented facing interior to the aircraft when the lower door is in its closed position and facing partially upward when the lower door is in its open position, the second side including stairs which are positioned for ascent and descent by human users to respectively enter and exit the aircraft when the lower door is in its open position;

(c) a first track, secured to the fuselage and located generally proximate to the top of the opening;

(d) a first rider carried by the upper door in engagement with the first track and moveable along the first track between first and second positions as the upper door moves between its respective open and closed positions;

(e) a second track, secured to the fuselage and located substantially aside a first of the fore and aft sides of the opening and at a height proximate to the top of the opening;

(f) a second rider carried by the upper door in engagement with the second track and moveable along the second track between first and second positions as the upper door moves between its respective open and closed positions;

(g) a third track, secured to the fuselage and located substantially aside the first of the fore and aft sides of the opening and at a height proximate a lower edge of the upper door; and (h) a third rider carried by the upper door in engagement with the first track and moveable along the third track between first and second positions as the upper door moves between its respective open and closed positions.

11. The system of claim 10 wherein, with the upper door and lower door in their respective closed positions, the upper door and lower door in combination substantially seal the opening.

12. The system of claim 10 wherein, with the upper door and lower door in their respective closed positions, the upper door and lower door are both substantially flush with the fuselage.

13. The system of claim 10 wherein at least one of the first, second and third tracks comprises:

a first portion, constituting a majority of its track, and extending generally parallel to the fuselage; and a second portion having a continuously curving transition to the first portion and extending partially inboard from the first portion toward the second position of the associated rider along the track.

14. The system of claim 10 wherein each of the first, second and third tracks comprises:

a first portion, constituting a majority of its track, and extending generally parallel to the fuselage; and a second portion having a continuously curving transition to the first portion and extending partially inboard from the first portion toward the second position of the associated rider along the track.

15. The system of claim 10 wherein during movement of the upper door between its open and closed positions, substantially the entire weight of the upper door is borne by one or more of the first, second and third track.

16. The system of claim 10 wherein the upper door is aft-opening and wherein the system further comprises a latch located predominately in a lower forward quadrant of the upper door.

17. The system of claim 10 further comprising a latch to selectively secure the upper door in its closed position, the latch including:

a pin, fixed within the upper door and extending in a pin direction, such that with the upper door in its closed position, the pin direction is generally parallel to a common direction of the first, second and third tracks at the associated second positions of the respective first, second and third riders; and a hook rotatable about a hook axis from a first position wherein the hook permits movement of the door between its closed and open positions and a second position wherein, with the door in its closed position, the hook engages a fixed bar on the fuselage to secure the upper door against movement out of its closed position, the hook axis being substantially orthogonal to the first portions of the first, second, and third tracks.

18. The system of claim 10 wherein, with the upper door and lower door in their respective closed positions, the upper door impedes movement of the lower door toward its open position.

19. The system of claim 10 wherein during movement of the upper door between its open and closed positions, substantially the entire weight of the upper door is borne by one or more of the first and second tracks.

20. The system of claim 10 further comprising at least one bulb seal mounted within a jamb of the opening and engaged to the upper door when the upper door is in its closed position, the at least one bulb seal:

extending along portions of the jamb proximate the left and aft sides and top of the opening;

facing outboard;

having an outwardly convex profile when in a relaxed condition; and having an at least partially outwardly concave profile when in a compressed condition caused by engagement with the upper door when the upper door is in its closed position.

21. A door system for selectively closing an opening in an aircraft fuselage, comprising:

an upper door moveable between an open position and a closed position substantially via a substantially longitudinal translation along said fuselage; and a lower door moveable between an open position and a closed position substantially via a substantially transverse movement, wherein, with the upper door and lower door in their respective closed positions, the upper door and lower door in combination substantially seal the opening.

22. The door system of claim 21 wherein the lower door has:

a first side, oriented facing exterior to the aircraft when the lower door is in its closed position and facing partially downward when the lower door is in its open position; and a second side, oriented facing interior to the aircraft when the lower door is in its closed position and facing partially upward when the lower door is in its open position, the second side including stairs which are positioned for ascent and descent by human users to respectively enter and exit the aircraft when the lower door is in its open position.

\* \* \* \* \*